UNITED STATES PATENT OFFICE.

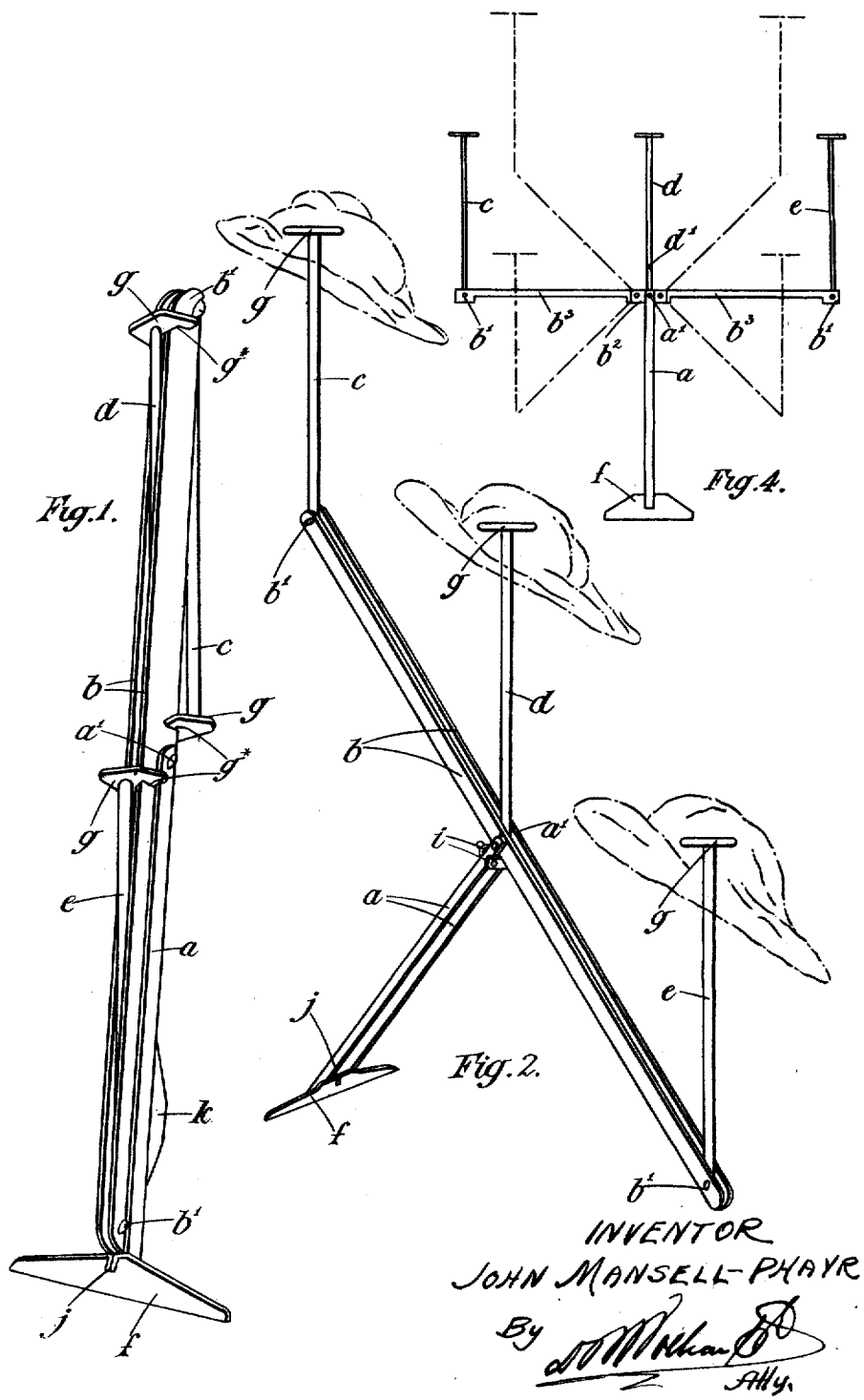

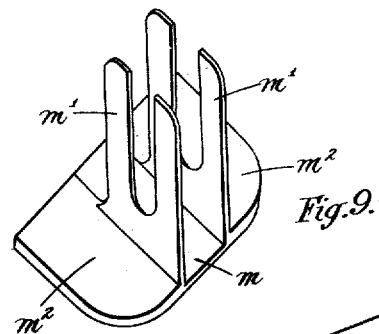
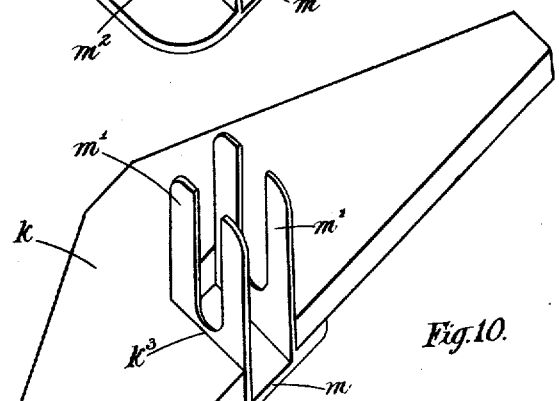
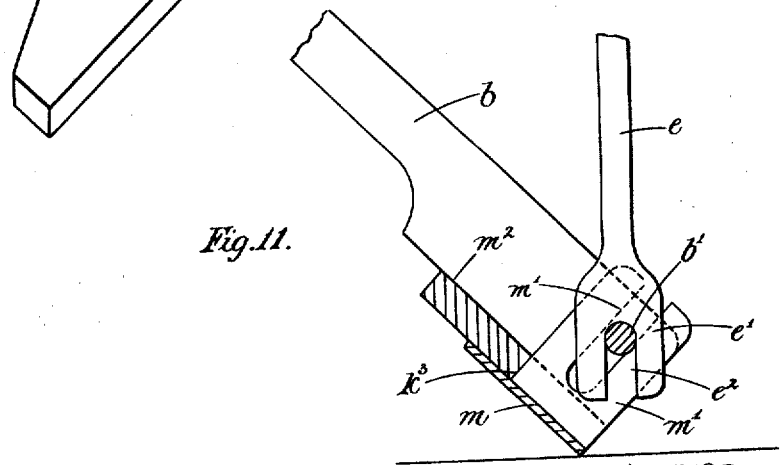

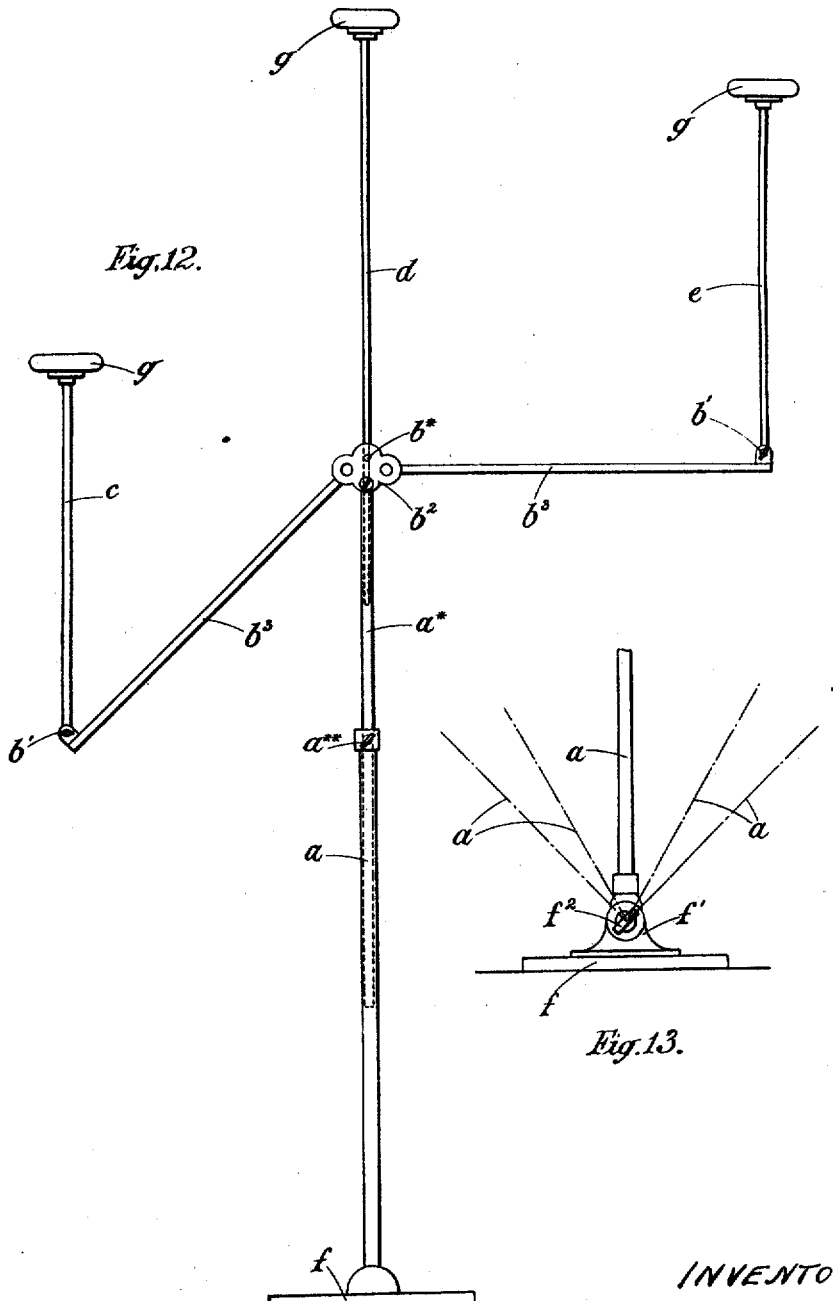

JOHN MANSELL-PHAYRE, OF WEST COWES, ISLE OF WIGHT, ENGLAND.

STAND FOR DISPLAYING GOODS FOR SALE OR INSPECTION.

1,412,126. Specification of Letters Patent. Patented Apr. 11, 1922.

Application filed March 25, 1920. Serial No. 368,558.

*To all whom it may concern:*

Be it known that I, JOHN MANSELL-PHAYRE, a subject of the King of Great Britain and Ireland, and a resident of West Cowes, Isle of Wight, county of Hampshire, England, have invented a certain new and useful Improvement in Stands for Displaying Goods for Sale or Inspection, of which the following is a specification.

My invention relates to collapsible stands for displaying goods, and to the kind which, when folded up, occupy but little room, but, when opened out, can be readily changed from any one of a multiplicity of shapes or designs to form another shape or design, to suit circumstances, positions or requirements without involving any structural alterations.

A stand in accordance with my invention, and which can be made of wood or metal, and is designed for the display of haberdashery and goods in general, consists essentially of a number of members, such as bars, rods, tubes, pivotally and lockably connected together in such manner that on opening out or turning said members on their pivotal connections, and in a plane perpendicular to the base of the stand, said stand can be arranged in the desired shape or design.

For a clear understanding of the invention, reference is to be had to the following description and accompanying sheets of drawings, wherein:—

Figure 1 is a view of the stand in its folded up condition.

Figures 2 and 3 show, by way of example only, two of the shapes or designs said stand may assume when opened out, Figure 2 showing the same arranged as a sloping design for resting on the ground or bench, whilst Figure 3 shows the stand arranged as for a pedestal design.

Figure 4 is a view showing a modified arrangement of stand hereinafter referred to.

Figure 9 is a view of a clip for attachment to the detachable part of the two-part foot.

Figure 10 is a view showing the clip attached thereto.

Figure 11 is a sectional view showing the detachable foot part and clip applied to the end of one of the pivotal members.

Figure 12 is a view illustrative of a telescopic arrangement of stand, the same being shown in one of its multiplicity of positions.

Figure 13 is a fragmentary view showing the foot member of the stand pivotally and lockably connected to the base thereof.

Like letters of reference indicate corresponding parts in the several figures.

Figure 3:
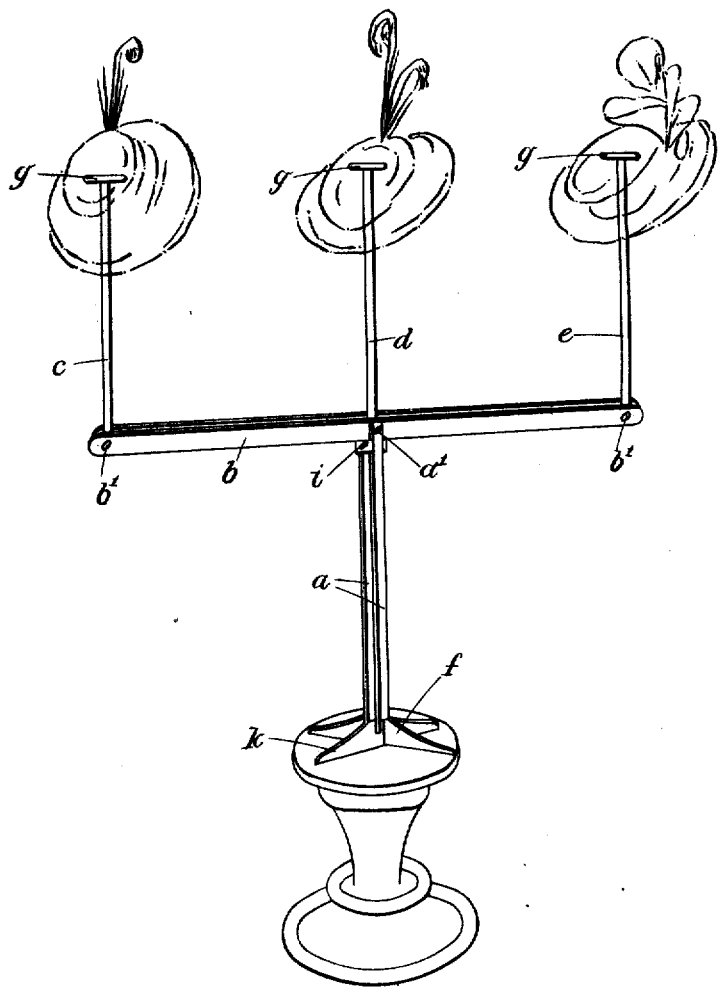

In carrying out the invention, and referring first to Figures 1, 2 and 3, the stand comprises the five members $a$, $b$, $c$, $d$ and $e$ respectively constituting a standard, a cross piece, and article supports, adapted to be folded up together in the manner shown in Figure 1. Of these five members, the members $a$ and $b$ each consist of two bars, the bars $a$ at their upper ends being pivotally connected to the bars $b$, outside thereof and centrally in their length by means of a thumbscrew or the like $a'$, or by any suitable arrangement of locking bolt to prevent any movement of said bars $a$ and $b$ in relation to one another when set in the required shape.

Between the bars $b$ of the cross piece, and at the ends thereof, the members $c$ and $e$ are pivotally mounted by means of thumbscrews or the like $b'$, and on the screw or the like $a'$ and also between said bars $b$ is pivotally mounted the member $d$, said members $c$, $d$ and $e$ being at their free ends each provided with a table or platform $g$, said tables or platforms $g$, which may be detachable or otherwise, being notched or cutaway at $g^*$—Figure 1—to take over the bars $b$ when said members $c$, $d$ and $e$ are folded up.

The member $a$ at its free end is provided with a foot $f$ affixed thereto in any suitable manner, and said foot $f$ is formed with a half notch $j$—Figures 1 and 2—for the engagement therein, when required, of another foot $k$—as shown in Figure 3.

A stop $i$—Figures 2 and 3—is provided for detachable engagement under the member $b$, to prevent said member $b$ turning when unevenly weighted, said stop $i$ being clamped on to the member $a$ by thumbscrew or other suitable means, and removed therefrom when the stand is to be folded.

Further, weights are, or may be, provided for detachable affixment to the feet $f$ and $k$, as the case may be, when the stand is used, in conditions such as shown in Figure 3, in order to maintain a firm base.

Further, in the modified arrangement of stand shown in Figure 4, each bar $b$ may be constituted by a three-part bar, that is to say, central portion $b^2$, to which the members $a$ are pivoted, and two end portions $b^3$ pivotally connected to the central portion $b^2$, the bars $c$, $d$ and $e$ being pivoted to these portions as in the previous example. This arrangement allows of the bars $b^3$ being set in positions pivoting from the central portion $b^2$ in addition to the bars $b$ as a whole pivoting at $a'$, thus increasing the range of positions. This arrangement of stand folds up in similar manner to that shown in Figure 1, the central bar $d$ being made in two parts pivoted together at $d'$ to facilitate the folding up.

Figure 5:
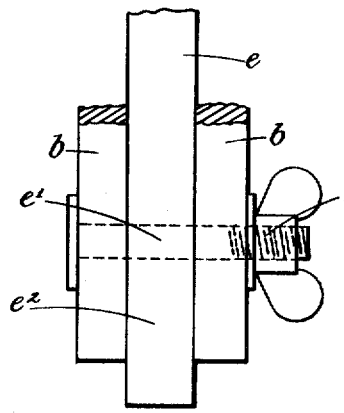
Figures 5 and 6 are views illustrative of the pivoting together of two members.
Figure 6:
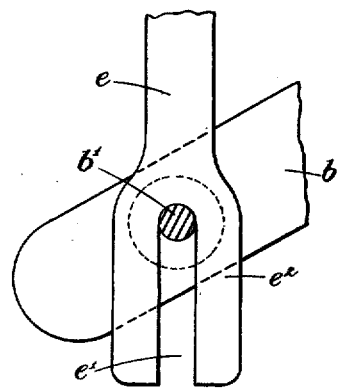
Figure 7:
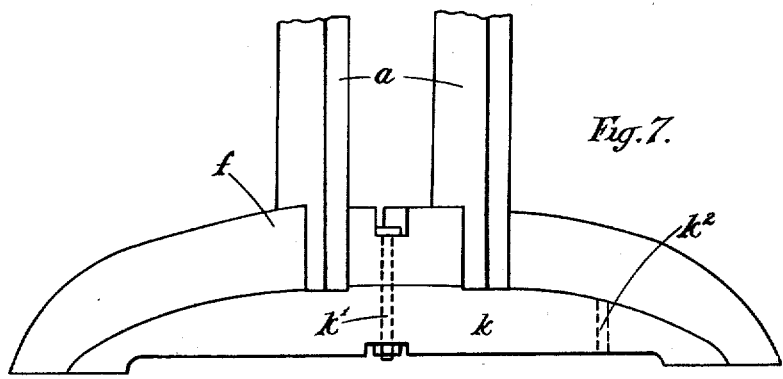
Figure 7 is a view of a modified arrangement of two-part foot, the same being shown in its closed up position.
Figure 8:
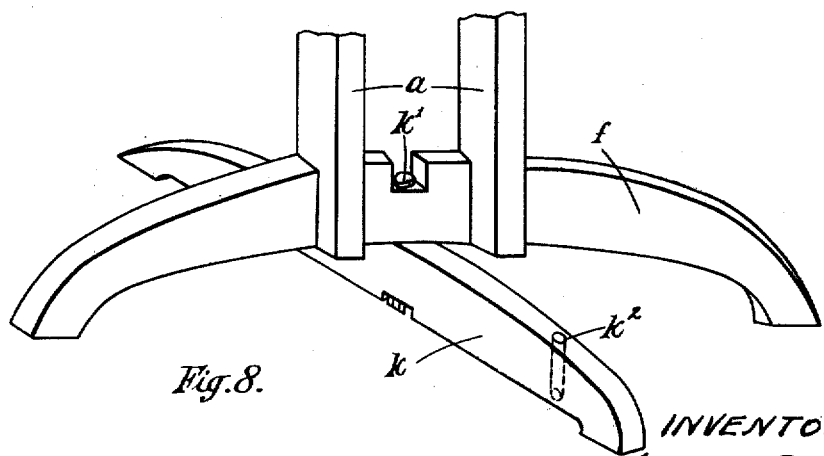
Figure 8 is a view of the same in its opened out position.

For the pivotal connection of the members such as $e$, which carry the goods for sale or inspection, the following arrangement is to be preferred, that is to say, said members $e$, which take between the bars or members $b$ carried by the standard $a$—Figures 7 and 8—of the stand, are as shown in Figures 5 and 6, provided with a slot $e'$ in the lower end $e^2$ to take over the stem of the thumbscrew $b'$ by which the parts are clamped or locked together, the provision of the slot not only allowing of the turning movements of the member $e$ within the members $b$, but also the easy withdrawal of said member $e$ without taking all the parts to pieces.

As shown in Figures 7 and 8, the members $a$ of the stand carry the fixed part $f$ of the foot of the stand, whilst the movable part $k$ of said foot is pivotally and detachably connected thereto by screw bolt and nut $k'$, the under surface of the fixed part $f$ and the upper surface of the movable part $k$ being so shaped as to allow of said part $k$ swinging within said part $f$, as in Figure 8, when required for use, a hole $k^2$ being provided in the part $k$ for the reception of a screw, by means of which the foot, as a whole, may be fixed to a counter or other part.

$m$—Figure 9—is a clip provided with two upstanding springy and slotted jaws $m'$, adapted to take in the slot $k^3$—Figure 10—of the detachable part $k$ to receive the pivot pin $b'$ at one end of the cross piece $b$, when it is desired to provide a broad base or bearing for the stand. That is to say the resilient jaws $m'$ may be inserted between the members $b$ and the lower end $e^2$ of the member $e$, the slot of jaws $m'$ taking over the stem of the thumbscrew $b'$, as shown in Figure 11, the whole being rigidly held together by tightening up said thumbscrew $b'$.

With the auxiliary foot $k$ applied in this manner, the stand is rendered capable of supporting a greater weight or an overhanging weight which it otherwise would not support.

In Figure 12 is shown a telescopic arrangement of stand, such arrangement giving an increase in the range of utility, viz:—adjustability as to height. For this purpose the foot member of the stand is constituted by two tubular parts $a$, $a^*$ respectively, the part $a$, which part $a$ is carried by a one-piece base or foot $f$, being provided at top with a thumbscrew $a^{**}$ to lock the part $a^*$ in its desired positions. The bar $b$ is constituted as in Figure 4, by a three-part bar, that is to say, by a central portion $b^2$ to which the part $a^*$ of the foot member is connected, and two end portions $b^3$ pivotally and lockably connected to said central part $b^2$, the goods-carrying bars $c$ and $e$ being pivoted and locked to said end portions $b^3$, whilst the central goods-carrying rod $d$ is arranged to slide through the central portion $b^2$ and telescope into the part $a^*$ of the foot member $a$, said bar $d$ being locked, when in its required position, to the central portion $b^2$ by means of a screw $b^*$.

Further, to increase the range of positions which the stand may take, the foot member $a$, as shown in Figure 13, is pivotally mounted in a lug $f'$ on the base $f$ and is locked in said lug $f'$ by means of thumbscrew $f^2$.

I claim:—

1. A collapsible display stand including a standard, a cross-piece pivotally connected to said standard and adapted to register with the standard when folded into alinement therewith, and article supporting arms pivotally carried by the cross-piece and foldable to a position substantially within the boundaries of the cross-piece.

2. A collapsible display stand including a standard, consisting of spaced members, a cross piece pivotally connected to said standard and also consisting of spaced apart members adapted to nest within the spaced apart members of the standard when the cross piece is folded into alignment therewith, and article supporting arms pivotally carried by the cross piece and adapted to be folded to a position substantially within the limits of the cross piece.

3. A collapsible display stand including a standard, consisting of spaced apart members, a supporting foot carried by one end of the standard, a cross piece pivotally connected to the other end of the standard and arranged between said members thereof whereby it may be folded between the members of the standard when collapsed, means carried by the standard adjacent to the point of pivotal connection of the cross piece therewith to hold the latter in the desired angular position with reference to the standard, and article supporting arms carried by the cross piece, said cross piece adapted to carry a steadying foot when the same is disposed in an inclined position to assist in supporting the stand.

In testimony whereof I have affixed my signature hereto this 9th day of February, 1920.

JOHN MANSELL-PHAYRE.